Figure 1:
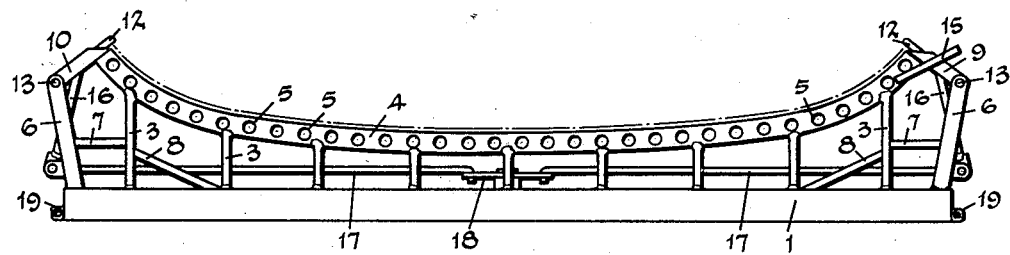
Figure 2:
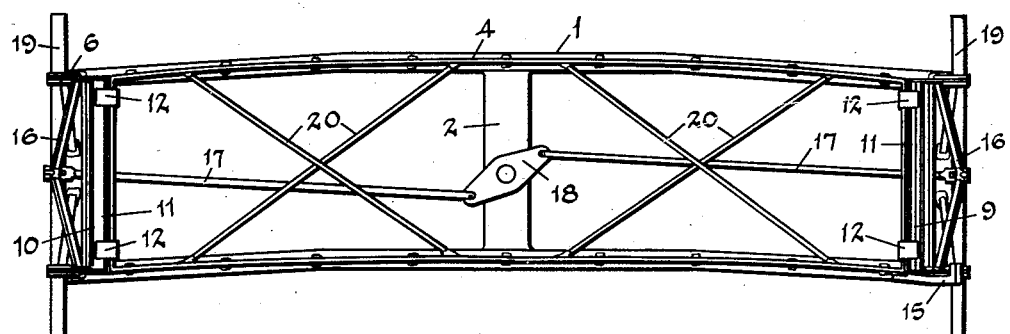
Figure 3:
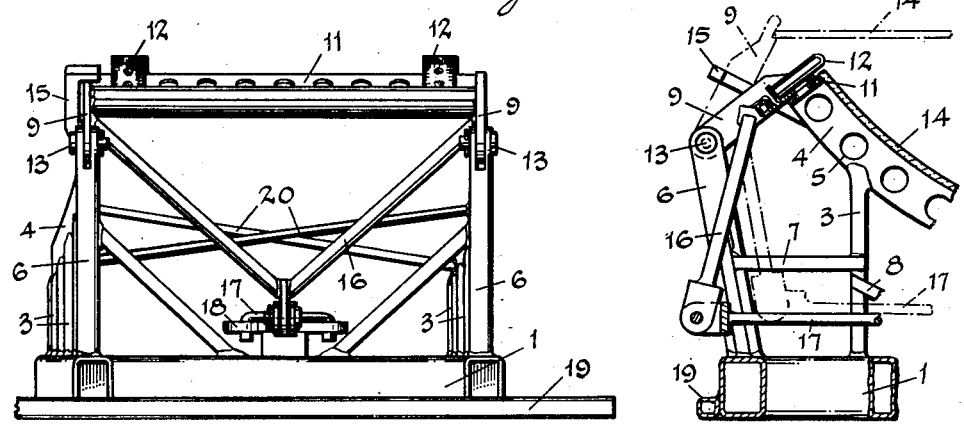
Figure 4:
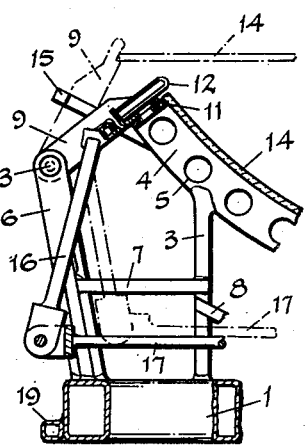
Figure 5:
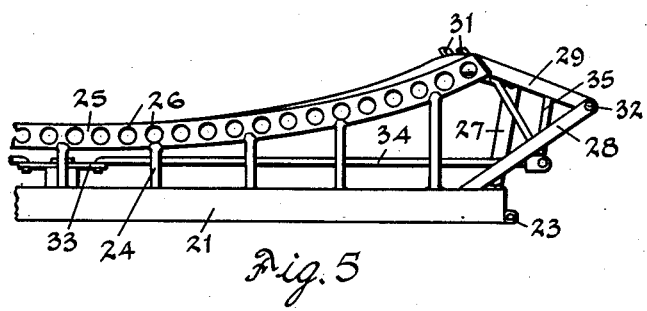
Figure 6:
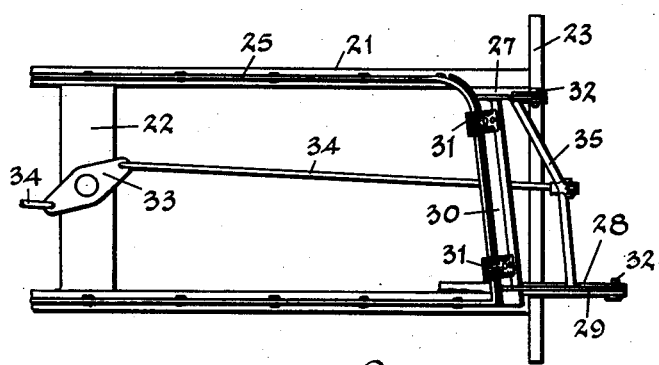
Figure 7:
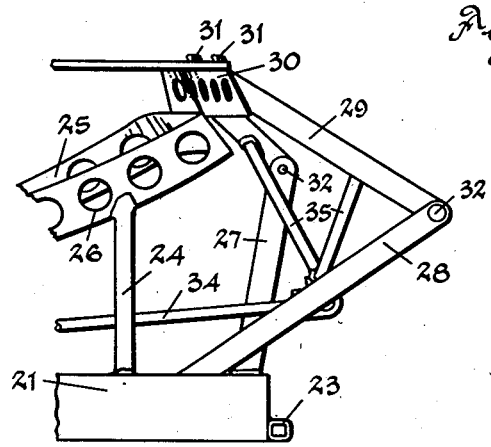

May 29, 1951     J. E. JENDRISAK     2,554,572
SHAPING MOLD

Filed Dec. 30, 1948                             2 Sheets-Sheet 1

Inventor
Joseph E. Jendrisak
By Nobbe & Swope
Attorneys

May 29, 1951 J. E. JENDRISAK 2,554,572
SHAPING MOLD

Filed Dec. 30, 1948 2 Sheets-Sheet 2

Inventor
Joseph E. Jendrisak
By Nobbe & Swope
Attorneys

UNITED STATES PATENT OFFICE 2,554,572

SHAPING MOLD

Joseph E. Jendrisak, Rossford, Ohio, assignor to Libbey-Owens-Ford Glass Company, Toledo, Ohio, a corporation of Ohio Application December 30, 1948, Serial No. 68,201

9 Claims. (Cl. 49—67)

This invention relates to glass bending apparatus and in particular to a mold that is equipped with pivoted glass-supporting members arranged to carry a sheet of glass above and in bending relation to the shaping surface of a mold and which supporting members are interconnected so that their movements in depositing a sheet of glass onto the shaping surface of the mold are synchronized.

When sheets of bent glass are to be used as windows it is desirable and in some cases necessary that the optical quality of the bent glass be substantially equal to the optical quality of a comparable flat glass sheet. In other words, the bending operation must not introduce local distortions, strains, or surface imperfections that would be visible in the finished bent glass. It is therefore necessary in the bending of glass for use as windows that the glass be supported at its marginal areas only; and that it be lowered onto the shaping surface of the mold during the bending process without sliding on any portion of such surface.

In order to avoid undesired sagging of the glass, since it is supported from its marginal area only, it is desirable that bending forces be exerted on the glass that will act to force it to its bent shape. Such forces tend to bend the glass to the desired final shape before the glass is sufficiently plastic or soft enough to bend or sag to such exact curvature by its own weight. When pivoted supporting members that carry the unbent glass sheet in bending relation to a mold are arranged to apply force longitudinally against the ends of the glass sheet it is necessary that the movement of such members be accurately controlled so that they accurately lower the glass onto the mold without permitting any portion of the glass to slide on the shaping surface of the mold.

According to the invention a pair of pivoted members arranged at each end of a mold are interconnected by a linkage arranged so that the movements of the members are synchronized and are generally symmetrical with respect to the shaping surface. The synchronizing linkage is particularly important if the radius of curvature of the shaping surface of the mold is relatively short near its ends, i. e., if the glass to be bent has its regions of sharp curvature located near its ends. When producing this type of bent glass it is desirable that a longitudinal force be applied against the ends of the glass and thus promote the bending of the end sections of the glass without requiring that the temperature of the glass be raised to the point at which it sags transversely of its length. By pivoting the supporting members on axes that are near and slightly below the ends of the shaping surface such members act as toggle links and by approaching in line conditions exert forces longitudinally of the mold. Thus in the bending of a glass sheet, which in its unbent condition is supported above the shaping surface on the pivoted members, the sheet of glass acts as a horizontal column or beam subjected to longitudinal compression forces. As the glass is heated and it softens slightly the bending moment exerted by its weight and which moment is a maximum at the center of the glass causes the glass to sag and thus fail as a column in compression. The longitudinally acting compression force then becomes effective in driving the center section of the glass downwardly toward the shaping surface of the mold until such center section comes in contact with the shaping surface. At this point the glass acts as two struts or columns each of which has sagged downwardly to some extent and which extend from the center of the glass sheet to the end points of support.

Since the pivoted supporting members are acting as toggle links, the horizontal force of which increases with deflection of the glass sheet, the glass is quickly forced into substantial contact with the shaping surface throughout its length. Toward the last end of the bending process the force exerted by the supports has a substantial component acting perpendicular to the surface of the glass which component, in combination with localized heating, is effective in bending the end sections of the glass sheet to the sharp curvature occurring at the ends of the shaping surface of the mold.

In this method of bending glass it is necessary that the pivoted supporting members move at generally the same rate. If the pivoted frames do not move at the same rate it is difficult if not impossible to deposit the glass sheet on the shaping surface of the mold without having some portions of the glass slide on the mold. Such sliding movement is detrimental to the quality of the finished glass. Such sliding movement is difficult to prevent because, in the absence of any synchronizing linkage, the system comprising the pivoted members and the glass sheet is in unstable equilibrium and a slight departure from exactly balanced conditions causes one of the pivoted members to carry its end of the glass downwardly while the other pivoted member is either pushed back tending to lift its end of the glass or is held in its original position until the first member has completed its travel.

The principal object of this invention is to provide a glass bending mold with pivoted supports that are arranged to carry a flat sheet of glass above the shaping surface of a mold and to lower the glass onto the shaping surface during the bending operation without causing the glass to slide on any portion of the mold and without allowing any object to touch any of the glass except along its marginal area.

Another object of the invention is to provide a synchronizing linkage between the pivoted supports so that the supports carry the glass directly to its intended position on the shaping surface.

A still further object of the invention is to arrange the pivoting axes of the pivoted supports in skewed relation to the mold so that the glass contacting portion of the pivoted support may remain in alignment with the edge of a non-rectangular glass sheet during all stages of a bending operation.

A still further object is to provide a synchronizing linkage in the form of a pivoted lever that is link connected to each of the pivoted supports and which by its rotation and connection to such supports holds them in synchronized relation as they deposite a sheet of glass onto the shaping surface.

More specific objects and advantages are apparent from the following description in which reference is made to the accompanying drawings.

In the drawings:

Figure I is a side elevation of a glass bending mold embodying the invention.

Figure II is a plan view of the improved mold.

Figure III is an end view of the mold.

Figure IV is a fragmentary elevation, partly in section, of one end of the improved mold.

Figure V is a fragmentary elevation of a modified form of glass bending mold.

Figure VI is a fragmentary plan view of the modified mold.

Figure VII is a fragmentary side elevation of one end of the modified mold.

These specific figures and the accompanying description are intended merely to illustrate the invention but not to limit its scope.

The glass bending mold constructed according to the invention comprises a generally rectangular base 1 which in plan conforms generally to the outline of a sheet of glass to be bent. This base is preferably constructed of rectangular cross section stainless steel tubing and includes a central cross member 2 which serves to stiffen the base. A plurality of slender pedestals or posts 3 erected from the base 1 carry at their upper ends a thin steel strip 4 the upper edge of which constitutes the shaping surface of the mold. The strip 4, to reduce its heat capacity, is provided with a plurality of closely spaced holes 5. These holes 5 retard the tranmission of heat through the strip 4 and thus allow the shaping surface to reach the same temperature as the glass being bent. The provision of the holes 5 accomplishes much the same result as crenelating the upper edge of the strip to reduce the amount of metal in contact with the glass. A strip having the holes 5 is preferable since the shaping surface is continuous.

Uprights 6 that are erected from each end of the base 1 and braced by struts 7 extending from adjacent ones of the pedestals 3 reinforced by braces 8, at their upper ends carry pivoted support members 9 and 10 each of which is provided with a glass sheet engaging surface 11 (Figure III) and locating fingers 12. The pivotal connections 13 between the uprights 6 and the pivoted supports 9 and 10 are located beyond the ends of the mold rim or shaping surface strip 4 and generally near but below the level of the ends of the mold shaping strip 4. As may be seen in Figure IV, the pivoted support members 9 and 10 may be swung back toward the vertical to receive an unbent glass sheet 14. The range of movement of the pivoted supporting member 9 is limited by a hook shaped bracket 15 so that the member may not reach a position at which it would tend to fall away from the mold.

As the glass sheet 14 is heated in the furnace through which the mold is carried it tends to soften and start to sag under its own weight. As it sags the supports 9 and 10 rock inwardly on their pivots 13 so as to continue to carry the glass free from the shaping surface of the mold. Furthermore, by locating the pivoting axes 13 at nearly the same level as the ends of the shaping surface of the mold, a fairly large component of force acting horizontally is exerted against the end of the glass so that such ends are urged toward each other to accelerate the bending of the glass.

It is desirable in the operation of a mold of this nature that the glass bend and sag so that the center section first contacts the shaping surface of the mold and that the longitudinally directed force then act to force the remaining portions of the glass into contact with the mold. If the process is carried out in this manner there is no tendency for any portion of the glass to slide on the shaping surface or to drag across the ends of such surface. However to secure this type of action it is necessary that the movements of the pivoted supporting frames 9 and 10 be synchronized.

Since the glass is carried above the pivoting axes of the pivoted frames it and the supports are in unstable equilibrium and any movement of either support tends to disturb such equilibrium and to drive the glass toward the more nearly vertical pivoted support. This motion continues until one support lowers its end of the glass sheet onto the shaping surface while the other support is held in its original position or is forced to a more nearly vertical position. If a ratchet means, sliding links or other means are used to prevent reverse movement of either pivoted support then that support which is more nearly vertical remains in its initial position until the other end of the glass has been lowered onto the shaping surface and the glass sheet bridges from that point to the more nearly vertical support. As the softened glass sags from such position the first deposited end slides a short distance on its end of the shaping surface until it finally conforms to the shaping surface. At the same time the other end of the glass is pushed into position but since the glass was not lowered uniformly onto the shaping surface but rather pushed to one end, an excess of glass occurs at this end and the support does not move all the way to the shaping surface.

To overcome this difficulty, according to the invention, each of the pivoted support members 9 and 10 is provided with a depending arm 16 which is V-shaped in end elevation with the legs of the V extending up to and joining the side members of the pivoted supports 9 and 10. The lower ends of the V-shaped arm 16 are connected through links 17 to a lever 18 that is pivotally mounted on the cross member 2 of the base 1. The lever 18, links 17, and the V-shaped arms 16 synchronize the movements of the pivoted supports 9 and 10.

By interconnecting the pivoted supports 9 and 10 the instability resulting from the unstable equilibrium of the glass on the pivoted supports is eliminated, the ends of the glass are carried toward each other at generally equal rates and the center of the glass is lowered directly onto the center of the shaping surface. As the bending proceeds the glass continues to settle onto the shaping surface until finally the end portions come to rest on the ends of the shaping surface. At this time the glass sheet engaging surface 11 preferably moves away from the sheet leaving a slight gap between it and the sheet to insure there being no sliding of the glass over any portion of the surface. Also toward the end of the bending operation force is exerted perpendicular to the surface of the glass to produce in combination with localized heating the relatively sharp curvature occurring at the ends of the mold.

The elevation of the pivoting axis with respect to the end of the shaping surface determines to a large extent the magnitude of the horizontal force applied to the glass during a bending operation. The higher such pivoting axis is located the greater the force exerted particularly when the support assumes a nearly horizontal position. The length of such support and consequently the angle through which it swings as a glass sheet is bent is determined by the length of the support. This length must be great enough so that at the extreme positions of the support it exerts substantial horizontal force against the glass. Furthermore the path of the end of the glass must at all points be located at a sufficient height above the end of the shaping surface so that the glass does not drag across such surface. These requirements are met by the pivoted supports as shown in the drawing which are arranged so that the end of the glass approaching the shaping surface moves toward such surface along a line that is located between a vertical line and a tangent to the surface. With this proportioning the glass is held above the shaping surface at all times until it is ready to move directly into contact with such surface without sliding on such surface.

These mold structures are designated for use in a roller type furnace, a furnace having an elongated heating chamber equipped with a large number of transverse power driven rollers forming a conveyor that carries the molds along. In order that the mold shall not rock when passing from conveyor roller to conveyor roller it is equipped with elongated end members 19 that are sufficiently long to contact at least two rollers of the conveyor at all times. The molds are also provided with cross bracing 20 extending diagonally across the open space of the mold between the side runs of the strip 4 forming the shaping surface. This arrangement provides an extremely rigid and stable shaping surface and in combination with the pivoted supports permits the economical production of bent glass windows having relatively sharp curvatures at the ends of the window.

The glass bending mold illustrated in the Figures I to IV is designed to produce a bent glass sheet that is generally cylindrical in form. The term "cylindrical" is used in its general meaning as denoting a surface that is generated by a line which moves perpendicular to its length and which throughout its path remains parallel to a given straight line although not necessarily at a fixed distance therefrom. If the distance remains constant the line traces a right circular cylinder. If the distance is not constant the line traces a cylindrical surface which may vary from a plane to a line and which may include portions of reverse curvature. Thus the curve formed by the mold shown in Figures I to IV is a cylindrical surface a section of which approximates a portion of an ellipse.

In Figures V to VII inclusive a modified form of the invention is shown. In this form the mold is adapted to produce a bent glass sheet that is somewhat warped in that it does not follow a cylindrical form but rather has portions that approximate sections of a conical surface. Furthermore, while the glass sheets being handled on the mold in Figures I to IV were generally rectangular in form (although the sides were more or less curved) the glass sheets handled on the modified form have their ends cut at an angle so as to form, in general, an equilateral trapezoid. (In this form also the side may be curved.)

In forming this type of a bend it is necessary to locate the pivoting axes of the supports at angles with respect to the adjacent edge of the shaping surface of the mold and of the glass so that the glass contacting portion of each support may in one position register with the end of the shaping surface of the mold and at another position register with the edge of an unbent glass sheet. Besides being arranged to register with the glass in its various positions the pivoting support must also furnish a substantial amount of end thrust against the glass sheets since in this mold, as in the one first described, a relatively large amount of force from the toggle action of the support is utilized to urge the glass into its bent configuration. This type of mold is further complicated in that the distance between the glass contacting portions of the pivoting supports in their upper position must be equal to the length of the curved sides of the shaping surface of the mold in order that such glass may be supported on the supports and also conform when bent to such shaping surface. These requirements are met by varying the distance between the end of the shaping surface and the pivoting axis so that a given angular movement of the pivoted support provides both the required change in elevation of the glass as well as the horizontal movement of the end of the glass. This condition is satisfied if the pivoting axis of each support is located along the intersection of two planes the first of which includes as an element thereof an end of the shaping surface of the mold and the other of which includes as an element thereof the edge of an unbent blass sheet resting on the pivoted support. In order that the two described lines or elements, the end of the shaping surface of the mold and the edge of the glass may coincide when the glass is in its bent position it is further necessary that the intersection of the planes be at equal distances from these surfaces when they are in their spaced apart position prior to a bending operation.

As in the previously described mold it is also desirable that the pivoting axis of the pivoted support be located beyond and above a line that is drawn perpendicular to the surface of the bent glass at the end of the mold. This condition insures that the glass approaches and is deposited upon the shaping surface without sliding thereon.

Referring to the drawings a modified mold for producing warped bends includes a generally rectangular base 21 constructed of rectangular cross-section tubular steel sections welded together to form a generally rectangular frame generally corresponding in outline to the margin of a glass sheet to be bent. This base 21 is further provided with a cross web or member 22 that serves to stiffen the side members of the base 21 and maintain it in more nearly rigid alignment. Cross members 23 are located at each end of the base 21 and serve as runners or supports to prevent the base 21 from rocking as it passes from roller to roller on a roller conveyor extending through the bending furnace. A plurality of slender pedestals or posts 24 are erected at intervals along the side of the base 21 and at their upper ends support an edgewisely mounted flat steel strip 25 the upper surface of which constitutes the shaping surface of the mold. The strip 25 is provided with a plurality of holes 26 that serve to reduce the heat capacity of the strip without seriously affecting its strength or stiffness.

At each end of the base 21 a pair of standards 27 and 28 are erected the standard 27 being nearly vertical while the standard 28 extends outwardly and upwardly at approximately a 45° angle. A pivoted support 29 which includes a glass supporting surface 30 and locating fingers 31 is pivotally mounted from the upper ends of the uprights 27 and 28.

In designing the supporting frame 29 for a mold of this nature it is necessary to first determine the length of the edges of the glass as measured along the shaping surface of the mold and then to locate the supporting surface 30 in space so that it registers with the edge of a flat glass sheet that is cut to fit the shaping surface at the conclusion of a bending operation. Having determined the initial and final positions of the edge of the glass sheet the location of the pivot points 32 in the ends of the uprights 27 and 28 may be determined by locating such points on the perpendicular bisectors of lines passed through the initial and final positions of the ends of the support 30 with the pivot points located at a distance from the supporting edge that is generally proportional to the length of the travel of the particular end of the glass support surface 30. When selecting the initial position of the glass supporting surface it is necessary to locate such surface at an elevation above the end of the shaping surface 25 so that such supporting edge approaches the shaping surface from above as it carries a glass sheet into contact with the mold. If such supporting surface is located too low which would mean that the pivot points 32 would be located much nearer the base 21 there would be danger that the glass would slide over the corners or end of the shaping surface and be marred so as to be commercially unacceptable. Thus in this modified mold, as well as in the one first described, it is desirable that the pivot points be located a substantial distance above a line drawn through the end of the shaping surface and perpendicular to the surface of a bent glass sheet resting thereon.

As in the previous example it is also necessary to provide means for synchronizing the movements of the pivoted supports 29 during the bending operation. This is accomplished by a linkage comprising a reversing lever 33 that is pivotally mounted on the cross member of the cross web 22 of the base 21 and this is connected through the links 34 to V-shaped depending arms 35 of the pivoted support 29. This linkage overcomes the instability resulting from the unstable equilibrium of the glass sheets upon the pivoted supports and causes the glass to be deposited without any sliding between the glass and the shaping surface.

In each example of bending molds described the pivoted supports are interconnected by a synchronizing mechanism that is arranged so that the glass is deposited upon the shaping surface without any sliding action thereon. In each case the linkage is arranged according to the curvature of the glass and the travel of each end of the glass so that each supporting frame accommodates whatever motion is required to cause the central section of the glass sheet to drop directly against the corresponding portion of a mold shaping surface. If the glass being bent is symmetrical the linkage is also symmetrical.

The improved mold by proper location of the pivoting axes of the supports and synchronization of their movements allows glass sheets to be accurately bent without marring the surfaces thereof even though portions of the glass are to be bent to relatively sharp curvatures of either generally cylindrical or generally conical form. The locations of the pivotal supports cause the horizontal component of the force applied to the glass to increase from a fairly small value applied to an unbent glass sheet to a relatively large value as the glass sheet settles against the shaping surface of the mold.

Various modifications in the synchronizing linkage and in the location of the pivoting points of the supporting members may be made without departing from the spirit and scope of the invention.

Having described the invention, I claim:

1. In a mold for shaping sheets of glass, in combination, a frame having a shaping surface that conforms to the marginal area of a bent glass sheet, a pair of supports mounted at the ends of the frame for supporting an unbent glass sheet above the shaping surface, said supports being adapted to move toward each other and deposit the glass on such shaping surface as the glass softens, and a linkage interconnecting the supports for synchronizing the movement of the supports.

2. In a mold for shaping sheets of glass, in combination, a frame having a shaping surface that conforms to the marginal area of a bent glass sheet, a pair of supports mounted at the ends of the frame for supporting an unbent glass sheet above the shaping surface, said supports being adapted to move toward each other as the glass sags into contact with the mold, a pivoted lever mounted in the frame, and a link from each support to said lever for synchronizing the movement of said supports.

3. In a mold for shaping sheets of glass, in combination, a frame having a shaping surface that conforms to the marginal area of a bent glass sheet, a pair of supports arranged to support an unbent sheet of glass above the shaping surface and lower it onto said surface as the glass sags during bending, each of said supports being pivoted about an axis that is below at nearly the same elevation as the ends of said shaping surface, depending arms on each of said supports, and a linkage interconnecting the depending arms for synchronizing the movement of the supports.

4. In a mold for shaping sheets of glass, in combination, a frame having a shaping surface that conforms to the marginal area of a bent glass sheet, a pair of supports, each of said supports being pivoted about an axis that is angularly positioned with respect to the shaping surface and that is symmetrically located with respect to the initial and final positions of an end of a sheet of glass being bent, and a synchronizing linkage interconneting said supports for coordinating the movement of the supports.

5. In a mold for shaping sheets of glass, in combination, a frame having a shaping surface that conforms to the marginal area of a bent glass sheet, a pair of supports, each of the supports having a glass contacting edge and a locating finger for registering the edge of the glass on the supporting edge, said supports being pivotally mounted from the frame, the points of pivotal support being lower in elevation than the end of the shaping surface and being above a normal to the bent glass surface at the end of the glass, and means for interconnecting the supports to synchronize their movements.

6. In a mold for shaping sheets of glass, in combination, a frame having a shaping surface that conforms to the marginal area of a bent glass sheet, a pair of rockable supports, each of the supports having a glass sheet supporting edge that is movable toward and away from the end of the shaping surface, said supports being adapted to support a glass sheet in bending relation to the shaping surface and lower it onto such surface as it bends, and a linkage interconnecting said supports for synchronizing the movements of the supports.

7. In a mold for shaping sheets of glass, in combination, a frame having a shaping surface that conforms to the marginal area of a bent glass sheet, a pair of supports having sheet supporting surfaces thereon and mounted at the ends of the frame for movement from a position away from the shaping surface of the mold and in which said sheet supporting surfaces are above said shaping surface to a position adjacent said shaping surface and in which said sheet supporting surfaces are out of position to contact a bent glass sheet on said shaping surface, and a linkage for interconnecting the supports for synchronizing the movement thereof.

8. In a mold for shaping sheets of glass, in combination, a frame having a shaping surface that conforms to the marginal area of a bent glass sheet, a pair of supports arranged to support an unbent sheet of glass above the shaping surface and lower it onto said surface as the glass sags during bending, means for pivoting each of said supports about an axis that is below but closely adjacent the same elevation as the ends of said shaping surface, and a linkage for interconnecting the supports for synchronizing the movement thereof.

9. In a mold for shaping sheets of glass, in combination, a frame having a shaping surface that conforms to the marginal area of a bent glass sheet, a pair of supports each of which has a glass supporting surface movable from a position in which it supports opposite margins of an unbent sheet above said shaping surface to a position in which said opposite margins will be lowered onto the shaping surface of the mold, and means adjacent the opposite ends of each of said supports for pivoting said support on pivot points located on the perpendicular bisectors of lines passed through the initial and final positions of the ends of the support and at a distance from the supporting surface that is generally proportional to the length of the travel of the particular end of the glass supporting surface with which each of said pivot points is associated.

JOSEPH E. JENDRISAK.

REFERENCES CITED

The following references are of record in the file of this patent:

UNITED STATES PATENTS

| Number | Name | Date |
| --- | --- | --- |
| 760,959 | Connington | May 24, 1904 |
| 1,999,558 | Black | Apr. 30, 1935 |
| 2,330,349 | Galey | Sept. 28, 1943 |